United States Patent
Suzuki et al.

(10) Patent No.: US 7,983,479 B2
(45) Date of Patent: Jul. 19, 2011

(54) GENERATING A LOOK-UP TABLE FOR USE IN COLOR PROCESSING

(75) Inventors: Takahiro Suzuki, Tokyo (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 899 days.

(21) Appl. No.: 11/086,298

(22) Filed: Mar. 23, 2005

(65) Prior Publication Data

US 2005/0219585 A1 Oct. 6, 2005

(30) Foreign Application Priority Data

Mar. 31, 2004 (JP) ................................ 2004-106360

(51) Int. Cl.
*G06K 9/00* (2006.01)
*G09G 5/02* (2006.01)

(52) U.S. Cl. .................... 382/162; 382/167; 345/601

(58) Field of Classification Search .............. 382/162, 382/167; 345/591, 601–604; 358/518–521
See application file for complete search history.

(56) References Cited

U.S. PATENT DOCUMENTS

| | | | |
|---|---|---|---|
| 5,463,480 A * | 10/1995 | MacDonald et al. | 358/520 |
| 5,724,442 A | 3/1998 | Ogatsu et al. | |
| 6,388,674 B1 * | 5/2002 | Ito et al. | 345/590 |
| 6,633,668 B1 | 10/2003 | Newman | |
| 6,912,306 B1 * | 6/2005 | Nakabayashi et al. | 382/167 |
| 7,013,042 B1 | 3/2006 | Yamada et al. | 382/167 |
| 7,027,067 B1 | 4/2006 | Ohga | 345/589 |
| 7,035,455 B2 | 4/2006 | Choi et al. | |
| 7,106,474 B1 | 9/2006 | Haikin et al. | |
| 7,120,295 B2 | 10/2006 | Edge et al. | |
| 7,158,146 B2 | 1/2007 | Ohga | 345/589 |
| 7,173,736 B2 | 2/2007 | Yamada | 358/1.9 |
| 7,199,900 B2 * | 4/2007 | Ogatsu et al. | 358/1.9 |
| 7,263,218 B2 | 8/2007 | Altenhof-Long et al. | |
| 2002/0071605 A1 | 6/2002 | Iida et al. | 382/165 |
| 2003/0161530 A1 | 8/2003 | Yamada et al. | 382/167 |
| 2003/0202194 A1 | 10/2003 | Torigoe et al. | 358/1.9 |
| 2005/0083346 A1 | 4/2005 | Takahashi et al. | 345/600 |
| 2005/0094169 A1 * | 5/2005 | Berns et al. | 358/1.9 |
| 2005/0219586 A1 | 10/2005 | Suzuki et al. | 358/1.9 |

FOREIGN PATENT DOCUMENTS

EP 2004/028143 A1 4/2004

(Continued)

OTHER PUBLICATIONS

Kim et al. ("Applying CIECAM97s in a Color Management System," IEEE Int'l Conf. on Systems, Man and Cybernetics, V. 2, Oct. 8-11, 2000, pp. 1524-1528).*

(Continued)

*Primary Examiner* — Yubin Hung
(74) *Attorney, Agent, or Firm* — Fitzpatrick, Cella, Harper & Scinto

(57) ABSTRACT

It is desired to adopt gamut mapping using a color appearance space in the processing system of an ICC profile. Upon generating an LUT complying with the ICC profile format, a grid point outside of the visible region on the CIELAB space is moved into the visible region. The Lab values of the grid point are converted into XYZ values, which undergo color appearance conversion to acquire color appearance values. The acquired color appearance values are mapped on the color gamut of a predetermined device.

6 Claims, 15 Drawing Sheets

FOREIGN PATENT DOCUMENTS

| | | |
|---|---|---|
| JP | 8-9172 | 1/1996 |
| JP | 2000-40140 | 2/2000 |
| JP | 2000-253269 | 9/2000 |
| JP | 2001-103331 | 4/2001 |
| JP | 2002-152359 | 5/2002 |
| JP | 2002-152539 | 5/2002 |
| JP | 2002-300415 | 10/2002 |
| JP | 2003-143425 | 5/2003 |
| JP | 2004-96444 | 3/2004 |
| JP | 2004-96447 | 3/2004 |

OTHER PUBLICATIONS

Cheng et al. ("Color Reproduction System Based on Color Appearance Model and Gamut Mapping," Proc. SPIE, vol. 4080, 2000, pp. 167-178.*

Johnson, G.M. (Color Appearance Modeling, ACM SIGRAPH Course Notes, Aug. 2004, pp. 1-66.*

English translation of JP 2004096447A (Yamada).*

English translation of JP 2004096447A (Yamada), 2004.*

Office Action, dated Dec. 5, 2008, in JP 2004-106360.

* cited by examiner

FIG. 6

| R | G | B | X | Y | Z |
|---|---|---|---|---|---|
| 0 | 0 | 0 | **** | **** | **** |
| 0 | 0 | 32 | **** | **** | **** |
| 0 | 0 | 64 | **** | **** | **** |
| ⋮ | ⋮ | ⋮ | **** | **** | **** |
|  |  |  | **** | **** | **** |
| ⋮ | ⋮ | ⋮ | ⋮ | ⋮ | ⋮ |
| 64 | 128 | 160 |  |  |  |
| 64 | 128 | 192 |  |  |  |
| 64 | 128 | 224 |  |  |  |
| ⋮ | ⋮ | ⋮ | ⋮ | ⋮ | ⋮ |
| 255 | 255 | 224 |  |  |  |
| 255 | 255 | 255 | **** | **** | **** |

FIG. 7

|   L*   |   a*   |   b*   |
|:------:|:------:|:------:|
| ****   | ****   | ****   |
| ****   | ****   | ****   |
| ****   | ****   | ****   |
| ****   | ****   | ****   |
| ****   | ****   | ****   |
|   ⋮    |   ⋮    |   ⋮    |
| ****   | ****   | ****   |

FIG. 8

| L* | a* | b* |
|---|---|---|
| 0 | −128 | −128 |
| 0 | −128 | −120 |
| 0 | −128 | 112 |
| ⋮ | ⋮ | ⋮ |
| 50 | 0 | 120 |
| 50 | 0 | 127 |
| 50 | 8 | −128 |
| ⋮ | ⋮ | ⋮ |
| 100 | 127 | 120 |
| 100 | 127 | 127 |

F I G. 10
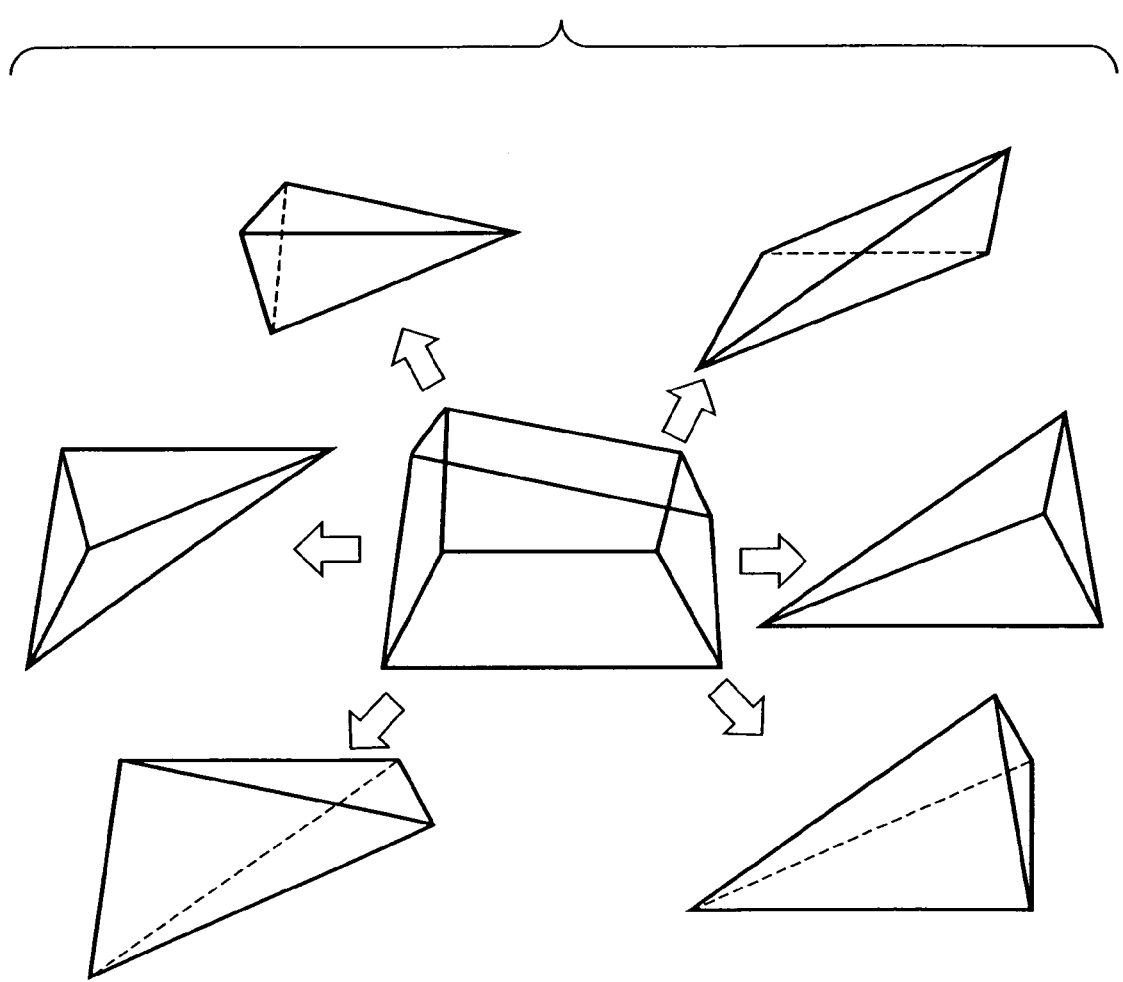

$\vec{AP} = s\vec{AB} + t\vec{AC} + u\vec{AD}$

GENERATING A LOOK-UP TABLE FOR USE IN COLOR PROCESSING

FIELD OF THE INVENTION

The present invention relates to a color processing method and apparatus thereof and, more particularly, to a process using a color appearance model.

BACKGROUND OF THE INVENTION

In recent years, along with the popularization of personal computers, it becomes easy to input an image using an image input device such as a digital camera, color scanner, or the like, to display and confirm that image using an image display device such as a CRT, LCD, or the like, and to output the image via an image output device such as a color printer or the like. In this case, in order to correct any color appearance difference due to the difference between color gamuts of the display and output devices, a color matching process (gamut mapping) is normally executed. That is, the color appearance difference between the devices is absorbed by the color matching process.

As one of color matching processes, a method using an ICC profile is known. Note that the ICC profile is a profile based on a format defined by International Color Consortium.

As shown in FIG. 1, the process using an ICC profile converts the RGB values of an image obtained by the input device into CIEXYZ or CIEL*a*b* values as a device-independent color space using a source profile, and converts the CIEXYZ or CIEL*a*b* values into the device RGB values of the output (display) device using a destination profile. The source profile describes an RGB to XYZ conversion matrix or an RGB to Lab conversion lookup table (LUT) that represents the color reproduction character of the input device. On the other hand, the destination profile describes a Lab to device RGB LUT according to a specific format. The LUT of this destination profile has the following format. That is, grid point data obtained by evenly n-slicing (n is an integer; to divide into n−1 slices) an L* value region $0 \leq L^* \leq 100$, an a* value region $-128 \leq a^* \leq 127$, and an b* value region $-128 \leq b^* \leq 127$ are defined, and the LUT describes device RGB values obtained by mapping these L*a*b* values onto the color gamut of the output device.

In this manner, in the processing system of the ICC profile, color matching information, i.e., gamut mapping information is described in the LUT in the destination profile together with color gamut information of the output device.

On the other hand, a color appearance model that models the human visual character with higher precision than the conventional CIELAB color space has been announced. The color values (e.g., J*a*b* values) of this color appearance space can be calculated from CIEXYZ values. By making gamut mapping using these J*a*b* values, color matching more suited to the human visual character can be done.

When an estimation of color matching using the color appearance space realized by the processing system of the ICC profile is made, a new destination profile must be generated from a destination profile of the ICC profile. Note that this generation method is the invention to explain later, however, this generation method is explained in here to clear a subject of the invention.

The destination profile is embedded with the LUT in the predetermined format that describes the relationship between the L*a*b* values and RGB values (DevRGB). In other words, in order to convert color matching information using the color appearance space into a destination profile, the following processes are required: (i) the L*a*b* grid points in the predetermined format are converted into J*a*b* values using color appearance conversion formulas, (ii) the J*a*b* values are mapped into the color gamut of the output device, (iii) the mapped J*a*b* values are converted into the device RGB, and (iv) the device RGB values are stored in an LUT. The flow of calculations is L*a*b*→J*a*b*→J*'a*'b*'→DevRGB, as shown in FIG. 2.

However, the conversion formula required to obtain the color values J*a*b* of the color appearance space does not support colors outside of the visible region. In the color appearance conversion, for example, color adaptation conversion, cone response conversion, or opponent-colors response conversion is made so the color values approximate the human visible character. The conversion method of the color adaptation conversion is linear conversion represented by matrix conversion given by:

$$A' = \begin{pmatrix} a_{00} & a_{01} & a_{02} \\ a_{10} & a_{11} & a_{12} \\ a_{20} & a_{21} & a_{22} \end{pmatrix} A \quad (1)$$

The cone response conversion also performs, in addition to the matrix conversion, an exponentiation given by:

$$A' = \frac{b(cA/d)^e}{f + (cA/d)^e} + g \quad (2)$$

where $a_{00}$ to $a_{22}$, and b to g are constants (for $0 \leq e \leq 1$), A is a value before conversion, and A' is a value after conversion.

The opponent-colors response conversion converts the values after cone response conversion into coordinate J*a*b* values suited to the human visual character, and linear conversion and triangular function conversion are used as its representative conversion formulas.

According to these conversion formulas, when XYZ values indicating a color outside of the visible region are input, the color adaptation conversion (equation (1)) as the linear conversion can be calculated, but calculation errors may occur when the exponentiation like equation (2) is calculated. This is for the following reason. That is, the constants in equations (1) and (2) are set so that (cA/d) in equation (2) assumes a positive value in case of the color within the visible region. However, (cA/d) often assumes a negative value when a color outside of the visible region is input, thus disabling calculations.

More specifically, as shown in FIG. 3, of the L*a*b* grit points defined on the CIELAB space, a color (e.g., L*=0, a*=−128, b*=−128) outside of the visible region cannot be converted into J*a*b* values, and device RGB values corresponding to that grid point cannot be calculated. In practice, when color matching is done by the processing system of the ICC profile, it is impossible that an input image includes a color outside of the visible region, but a color in proximity of a boundary of the visible region often exists. In order to interpolate such color using an LUT, since not only grid points within the visible region but also those outside of the visible region are used, appropriate device RGB values must be set for the grid points outside of the visible region.

As a color matching method using the ICC profile and color appearance space, a technique disclosed in Japanese Patent Laid-Open No. 2000-40140 (corresponding to U.S. Pat. No. 7,027,067, issued Apr. 11, 2006) has been proposed. However, the method disclosed in this reference is different from the method described in FIG. 2. The technique disclosed in this reference loads the color gamuts of respective devices from the source profile and destination profile described in the ICC profile format into a dedicated apparatus, and attains gamut mapping by converting the respective color gamuts into J*a*b* values using a CIECAM97 conversion formula as one of color appearance conversion formulas. When this technique is used, a new destination profile that records gamut mapping information on the J*a*b* space need not be generated, and the same profiles as the conventional ones need only be used. Hence, no problems caused by impossibility of color conversion as described above occur. However, since this technique requires a special apparatus upon color matching, it cannot be used in a general image manipulation application such as PhotoShop®. Since color matching is done using the dedicated apparatus, gamut mapping information described in the ICC profile is completely ignored.

In the processing system of the ICC profile, it is required to adopt gamut mapping using the color appearance space. Not only when an ICC profile is generated but also when a process is made on the color appearance space, it is inconvenient that colors outside of the visible region are not supported.

SUMMARY OF THE INVENTION

The first aspect of the present invention discloses a color process which moves a predetermined grid point on the CIELAB space into a predetermined region, converts Lab values of the grid point into XYZ values, applies color appearance conversion to the XYZ values of the grid point to acquire color appearance values, maps the acquired color appearance values onto a color gamut of a predetermined device, and generates a conversion table complying with the ICC profile format.

The second aspect of the present invention discloses an image process which stores color gamut information roughly corresponding to the visible region, checks if input color data falls outside a region indicated by the color gamut information, and then performs a conversion process using the color appearance model for the input color data, in which when it is determined that the input color data falls outside the region, the input color data is mapped to fall within the region and the color conversion is applied to the color data after mapping.

According to these color process and image process, an LUT obtained by converting the gamut mapping process on the color appearance space into an ICC profile can be generated. In this case, since a grid point outside of the visible region, which cannot undergo color appearance conversion, is mapped within the visible region in advance, and then undergoes color appearance conversion, an LUT without any information losses for grid points outside of the visible region is generated. Hence, when an image is converted by an ICC profile using this LUT, even when a color that barely falls within the visible region is input, and is interpolated using grid points outside of the visible region, satisfactory conversion can be made, and a high-quality image can be output.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 shows an example of color gamut data of an output device;

FIG. 7 shows an example of visible region color gamut data;

FIG. 8 shows L*a*b* grid point data stored in an LUT memory;

FIG. 10 is a view for explaining division examples of a hexahedron for an inside/outside determination process;

DESCRIPTION OF THE PREFERRED EMBODIMENTS

A color process (profile correction) as an embodiment according to the present invention will be described in detail hereinafter with reference to the accompanying drawings.

First Embodiment

An embodiment in which the present invention is applied to the process for generating an ICC profile (or a lookup table complying with the ICC compatible profile format) as that according to the present invention will be described in detail hereinafter with reference to the accompanying drawings.

[Overview]

An image process for generating an LUT complying with the ICC profile format according to the present invention moves a grid point on the CIELAB space, which satisfies a predetermined condition, into a predetermined region, converts CIEL*a*b* values into CIEXYZ values, and converts the XYZ values into color appearance space values using the color appearance conversion formulas and a parameter of the profile corresponding to a viewing condition. The obtained color appearance space values are mapped on the color gamut of a predetermined device.

[Arrangement]

Figure 1:
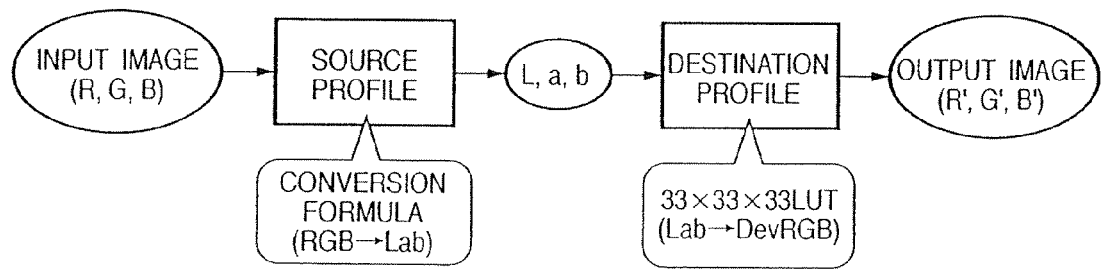
FIG. 1 is a chart showing a color matching process using an ICC profile.
Figure 2:
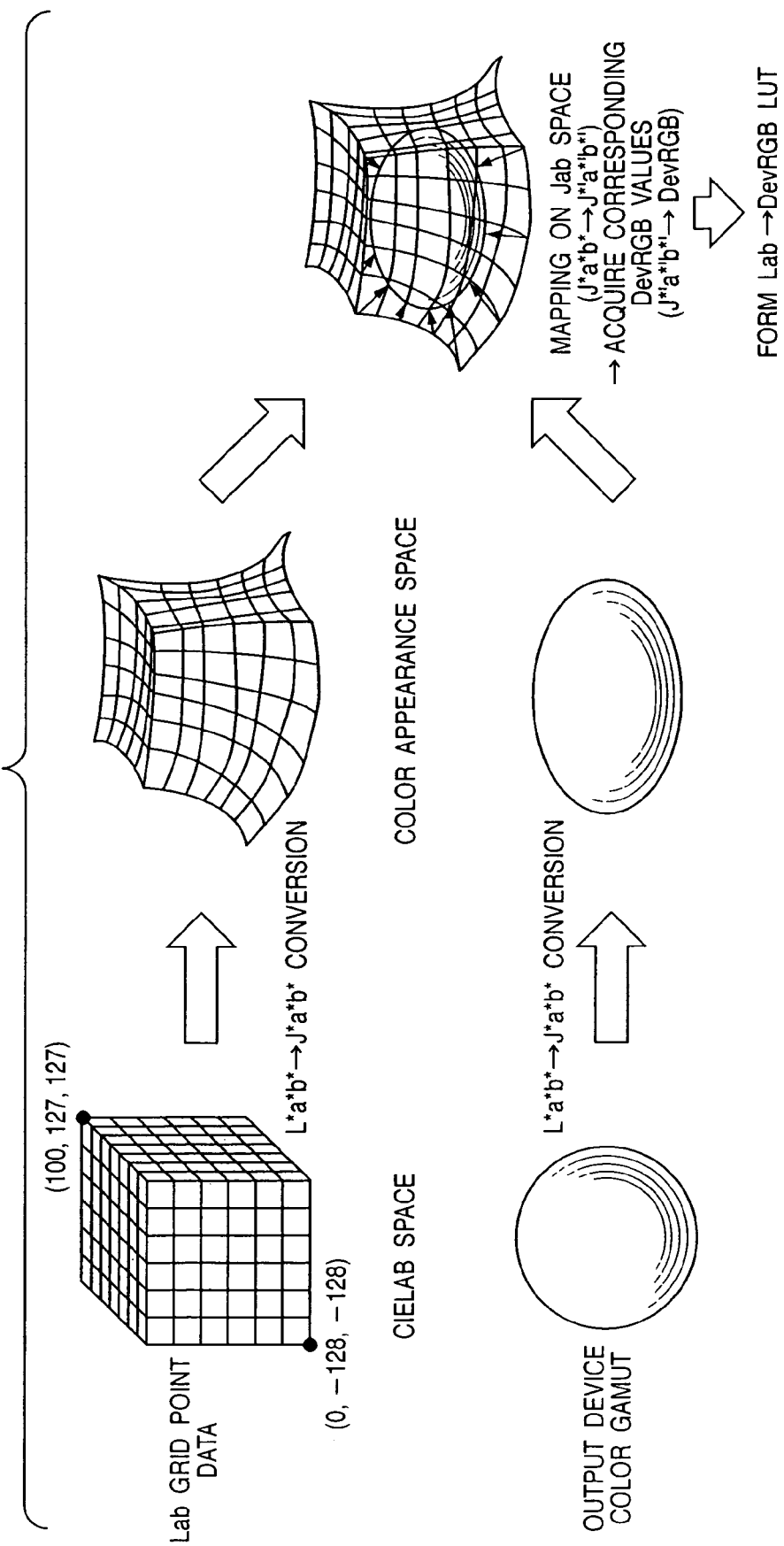
FIG. 2 is a chart showing the flow of processes upon implementing a color matching process using a color appearance space using the ICC profile.
Figure 3:
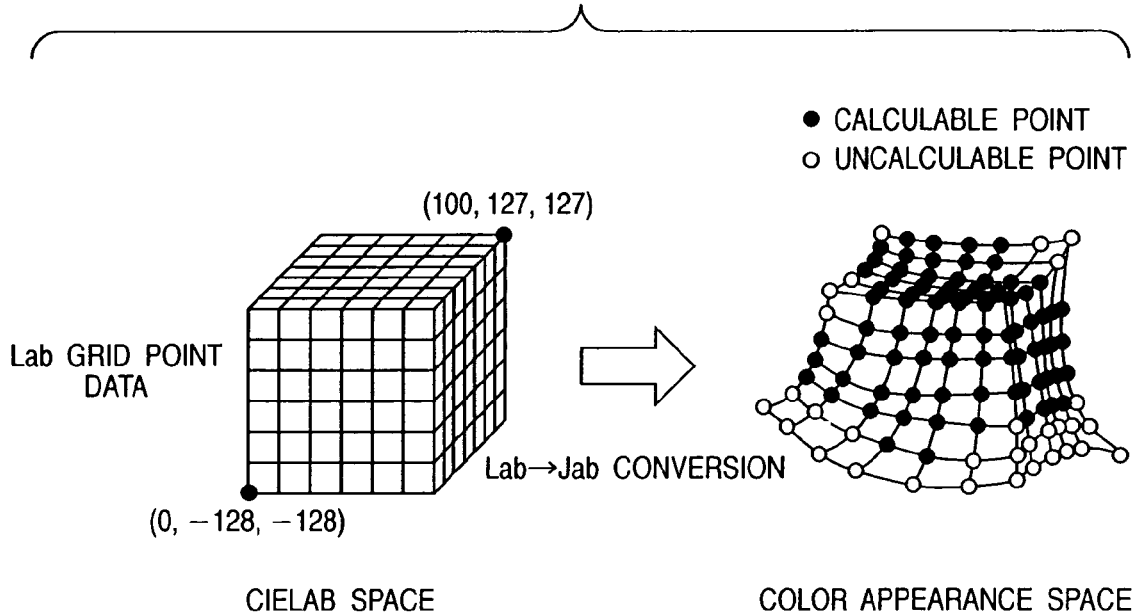
FIG. 3 is a view showing the relationship between the CIEL*a*b* grid points in the LUT of the ICC profile format, and the color appearance space.
Figure 4:
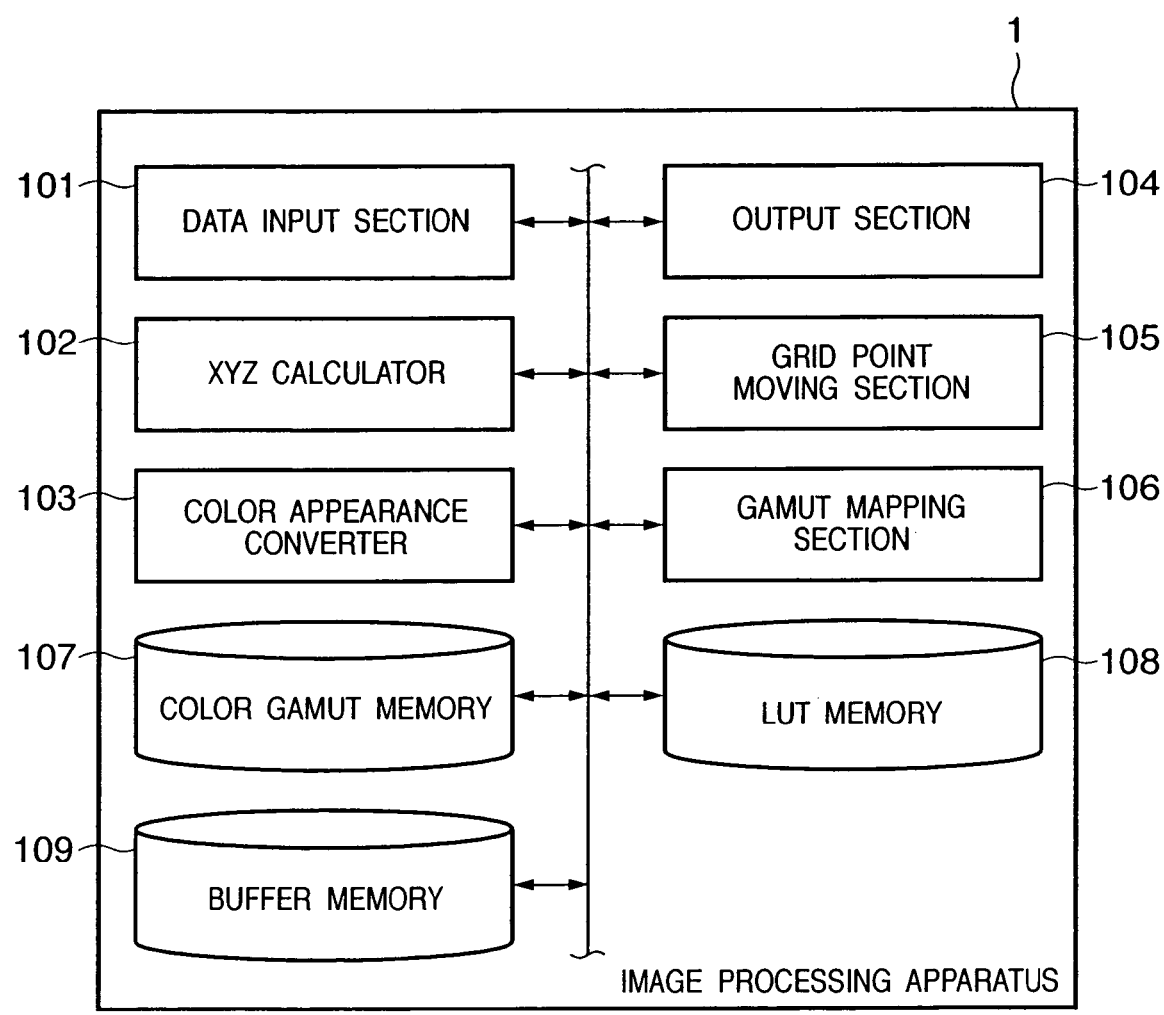
FIG. 4 is a block diagram showing the arrangement of an image processing apparatus according to the first embodiment.

FIG. 4 is a block diagram showing the arrangement of an image processing apparatus 1 according to the first embodiment.

The image processing apparatus 1 has an input section 101 for inputting color gamut data of an output device, an XYZ calculator 102 for calculating CIEXYZ values from grid point information (L*a*b*) on the CIELAB space stored in an LUT memory 108, a color appearance converter 103 for calculating J*a*b* values using color appearance conversion formulas from the XYZ values calculated by the XYZ calculator 102, an output section 104 for outputting an LUT, a grid point moving section 105 for moving a grid point outside of the visible region of those on the CIELAB space into the visible region, a gamut mapping section 106 for mapping J*a*b* values calculated by the color appearance converter 103 and grid point moving section 105 onto the color gamut of an output device stored by a color gamut memory 107, the color gamut memory 107 for storing color gamut data of the output device input by the input section 101, the LUT memory 108 for storing the J*a*b* values corresponding to a grid point sequence and respective values on the CIELAB space, J*'a*'b*' values after being mapped onto the color gamut of the output device, and DevRGB values of the output device corresponding to the J*'a*'b*' values, and a buffer memory 109 for temporarily saving the intermediate calculation results of processes.

[Operation of Image Processing Apparatus]

Figure 5:
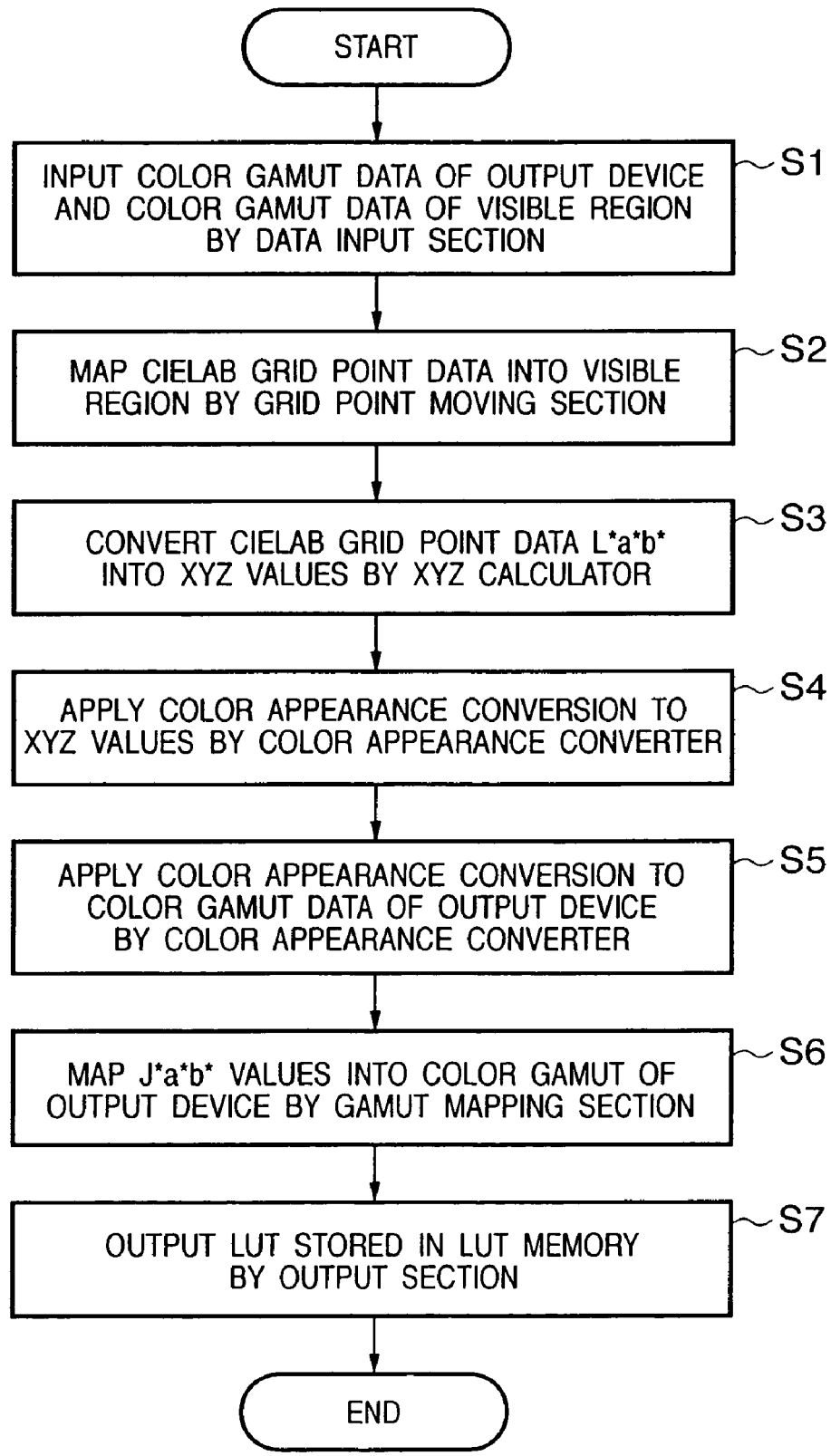
FIG. 5 is a flowchart showing the process executed by the image processing apparatus.

FIG. 5 is a flowchart showing the process to be executed by the image processing apparatus 1.

The input section 101 inputs color gamut data of the output device and visible gamut data, and stores them in the color gamut memory 107 (S1).

Figure 7:
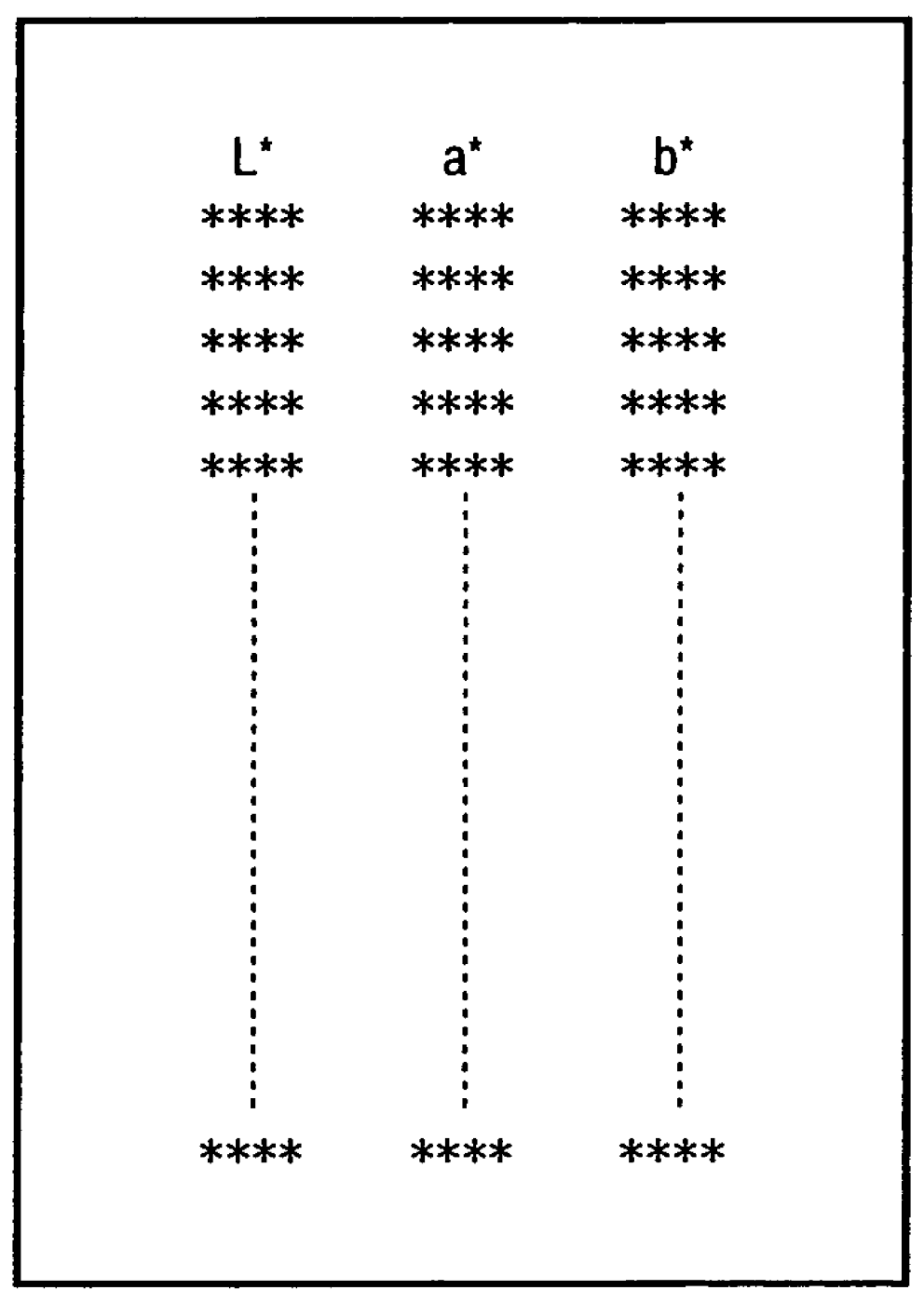

FIG. 6 shows an example of the color gamut data of the output device. For example, RGB data (729 colors) obtained by 9-slicing a region $0 \leq R, G, B \leq 255$, and output XYZ values of the output device corresponding to these data are used. As the XYZ values, data which are obtained by color patches generated by outputting the 729-color RGB data using a target output device are used. FIG. 7 shows an example of the visible gamut data. Data obtained by 9-slicing the visible gamut are used as in the output device color gamut data. These data are expressed by CIEL*a*b* values.

Next, the grid point moving section 105 maps predetermined grid point data L*a*b* which are stored in the LUT memory 108 in advance and are expressed by CIEL*a*b* values within the visible gamut indicated by the visible gamut data stored in the color gamut memory 107, and saves the mapped grid point data in the LUT memory 108 (S2). FIG. 8 shows L*a*b* grid point data stored in the LUT memory 108. The grid point data are a total of 35,937 colors of grid point data which have a format used in the destination profile and are obtained by evenly slicing a region $0 \leq L^* \leq 100$, a region $-128 \leq a^* \leq 127$, and a region $-128 \leq b^* \leq 127$ into 33 levels. In the following description, the grid point data sliced into 33 levels are used. However, the grid point data are not limited to 33 slices. For example, 9 slices, 17 slices, or 65 slices may be used. Note that the color gamut of the visible gamut data stored by the color gamut memory 107 can be a rough visible region.

The XYZ calculator 102 converts the grid point data L*a*b* which are stored in the LUT memory 108 and mapped on the visible region, into XYZ values (XYZ grid point data) using formulas (3), and stores them in the buffer memory 109 (S3).

$$f(Y)=(L^*+16)/116$$

$$f(X)=a^*/500+f(Y)$$

$$f(Z)=-b^*/200+f(Y)$$

$$X=Xn \cdot f(X)^3 \text{ when } f(X)^3 > 0.008856$$

$$X=\{f(X)-16/116\} \cdot Xn/7.787 \text{ when } f(X)^3 \leq 0.008856$$

$$Y=Yn \cdot f(Y)^3 \text{ when } f(Y)^3 > 0.008856$$

$$Y=\{f(Y)-16/116\} \cdot Yn/7.787 \text{ when } f(Y)^3 \leq 0.008856$$

$$Z=Zn \cdot f(Z)^3 \text{ when } f(Z)^3 > 0.008856$$

$$Z=\{f(Z)-16/116\} \cdot Zn/7.787 \text{ when } f(Z)^3 \leq 0.008856 \tag{3}$$

where Xn, Yn, and Zn are XYZ values of the white point (in case of D50, (Xn, Yn, Zn)=(96.43, 100.0, 82.51)).

Formulas (3) are presented under the assumption that the white point, i.e., a light source upon observing an image output by the output device, is D50. If a different environment upon observing an image is used (e.g., D65), Xn, Yn, and Zn corresponding to that white point are used. XYZ grid point data obtained by applying calculations given by formulas (3) to all L*a*b* grid point data are saved in the buffer memory 109.

The color appearance converter 103 converts the XYZ values calculated by the XYZ calculator 102 into J*a*b* values using color appearance conversion formulas (S4). The color appearance converter 103 converts color gamut data (XYZ values) of the output device stored in the color gamut memory 107 into color appearance values J*a*b*, and saves them in the color gamut memory 107 (S5). The gamut mapping section 106 maps the J*a*b* values within the color gamut of the output device, and converts the mapped J*a*b* values into the devRGB values to save the devRGB values in the LUT memory 108 (S6). The output section 104 outputs an LUT stored in the LUT memory 108 (S7). Detailed processes of the color appearance converter 103, grid point moving section 105, and gamut mapping section 106 in a series of processes described above will be explained later.

[Grid Point Moving Section]

Figure 9:
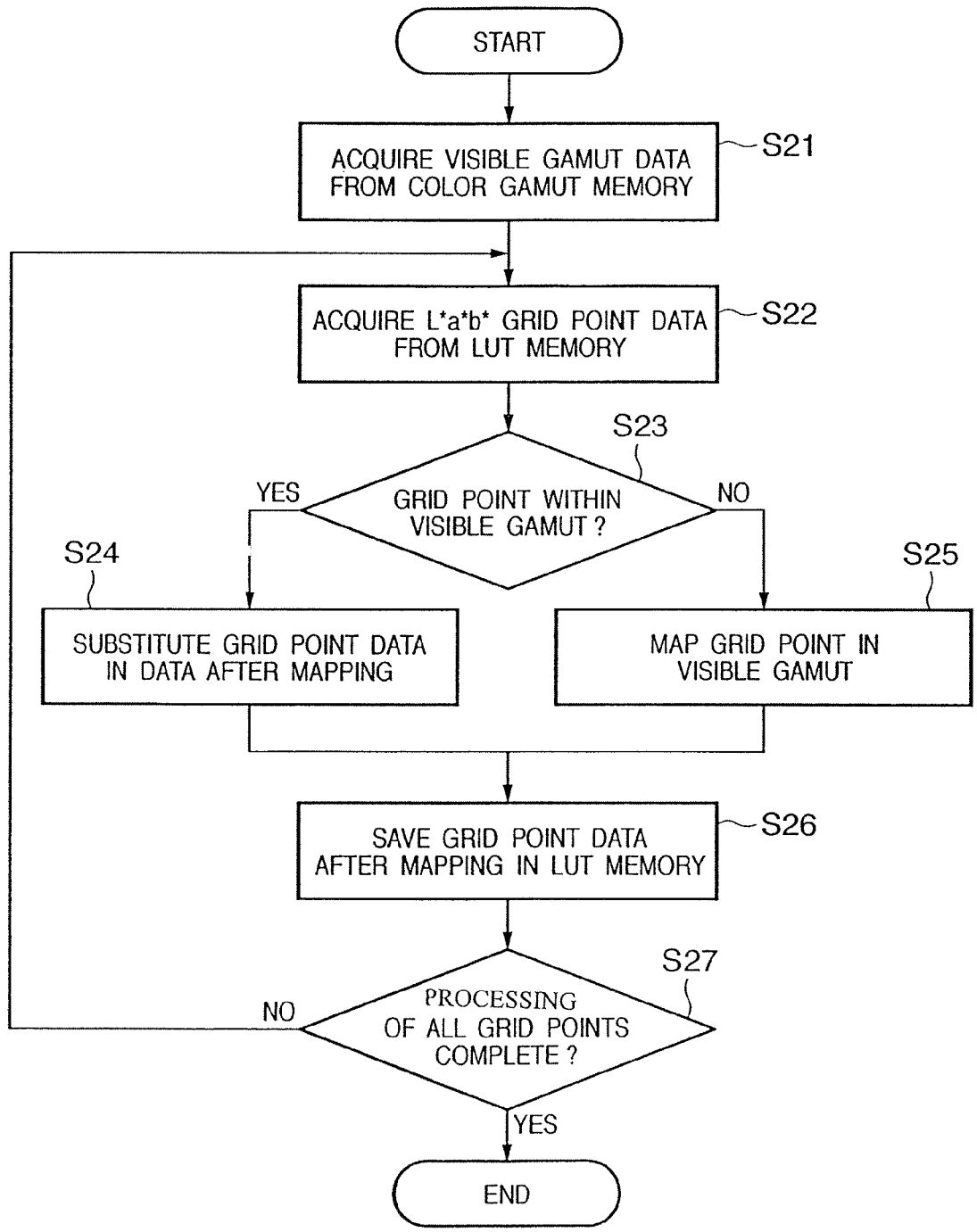
FIG. 9 is a flowchart for explaining the process of a grid point moving section.

FIG. 9 is a flowchart for explaining the process (S2) of the grid point moving section 105.

Visible gamut data are acquired from the color gamut memory 107 (S21), and grid point data (Lt, at, bt) is acquired from the LUT memory 108 (S22). Then, it is checked if that grid point falls within the visible region (S23).

Color Gamut Inside/Outside Determination Method

In this embodiment, the visible region is expressed by 729 points of data obtained by 9-slicing RGB data, i.e., 512 hexahedrons, and the visible region is approximated by the RGB color space. Therefore, if the grid point data (Jt, at, bt) is included in any of the 512 hexahedron, it can be determined that the grid point data is included in the visible region. In this embodiment, each hexahedron is further divided into six tetrahedrons, as shown in FIG. 10, and inside/outside determination for determining if each tetrahedron includes a grid point is made, thereby determining whether or not the grid point data are included in the hexahedron.

Figure 11:
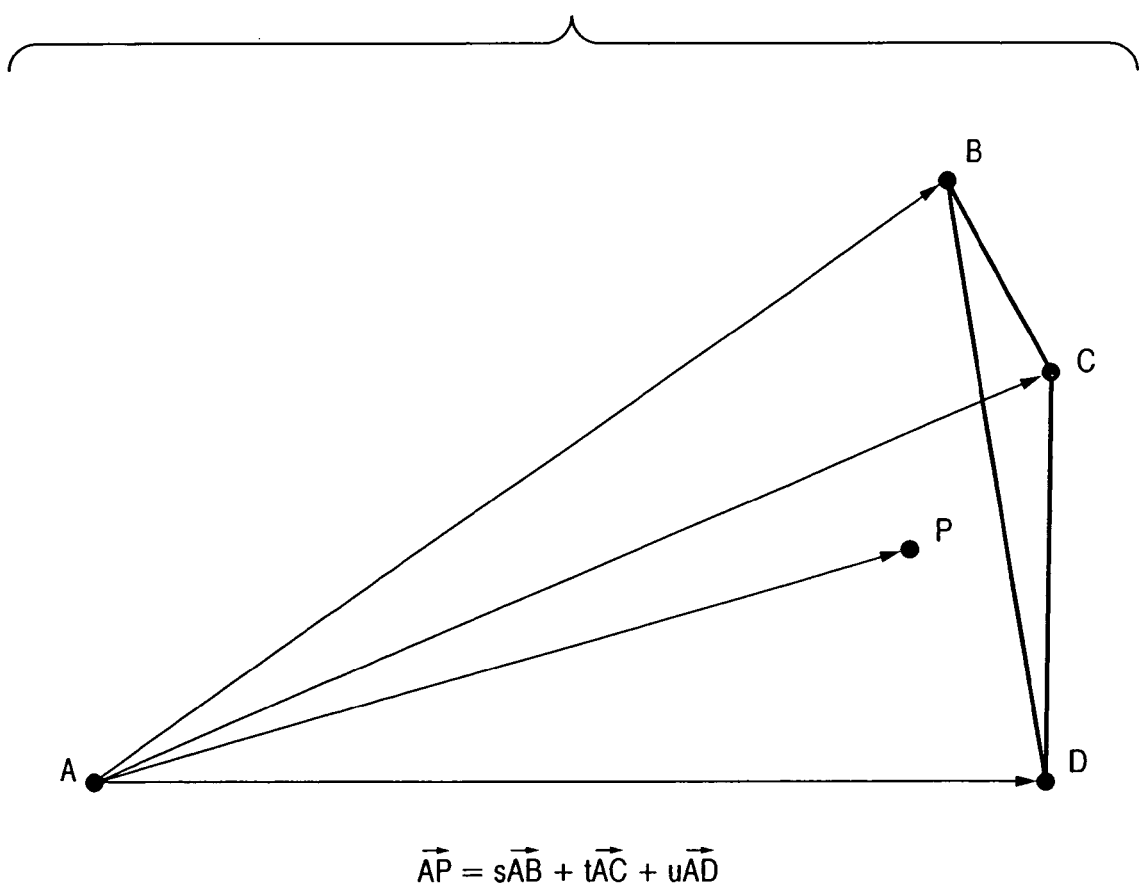
FIG. 11 is a view for explaining inside/outside determination of a tetrahedron.

FIG. 11 is a view for explaining inside/outside determination for a tetrahedron. Let A, B, C, and D be the vertices of a tetrahedron, P be grid point data, and $\uparrow AB$ be a vector from a point A to a point B. Then, we have:

$$\uparrow AP = s \uparrow AB + t \uparrow AC + u \uparrow AD \tag{4}$$

At this time, if the point P is included in the tetrahedron ABCD, inequalities (5) and (6) hold:

$$S+t+u \leq 1 \tag{5}$$

$$s \geq 0, t \geq 0, u \geq 0 \tag{6}$$

If inequalities (5) and (6) hold, it can be determined that the point P is present within the tetrahedron; otherwise, it can be determined that the point P is present outside the tetrahedron.

By executing the aforementioned inside/outside determination of the tetrahedron for six tetrahedrons, inside/outside determination of a hexahedron can be made. Furthermore, when this inside/outside determination of a hexahedron is executed for 512 hexahedrons, inside/outside determination for determining whether grid point data fall within the visible region is complete.

If it is determined that the grid point (Lt, at, bt) falls within the visible region, that grid point data (Lt, at, bt) is substituted in data (Lk, ak, bk) after mapping (S24); otherwise, that grid point (Lt, at, bt) is mapped within the visible region (S25). The mapped data is saved in the LUT memory 108 (S26).

Figure 12:
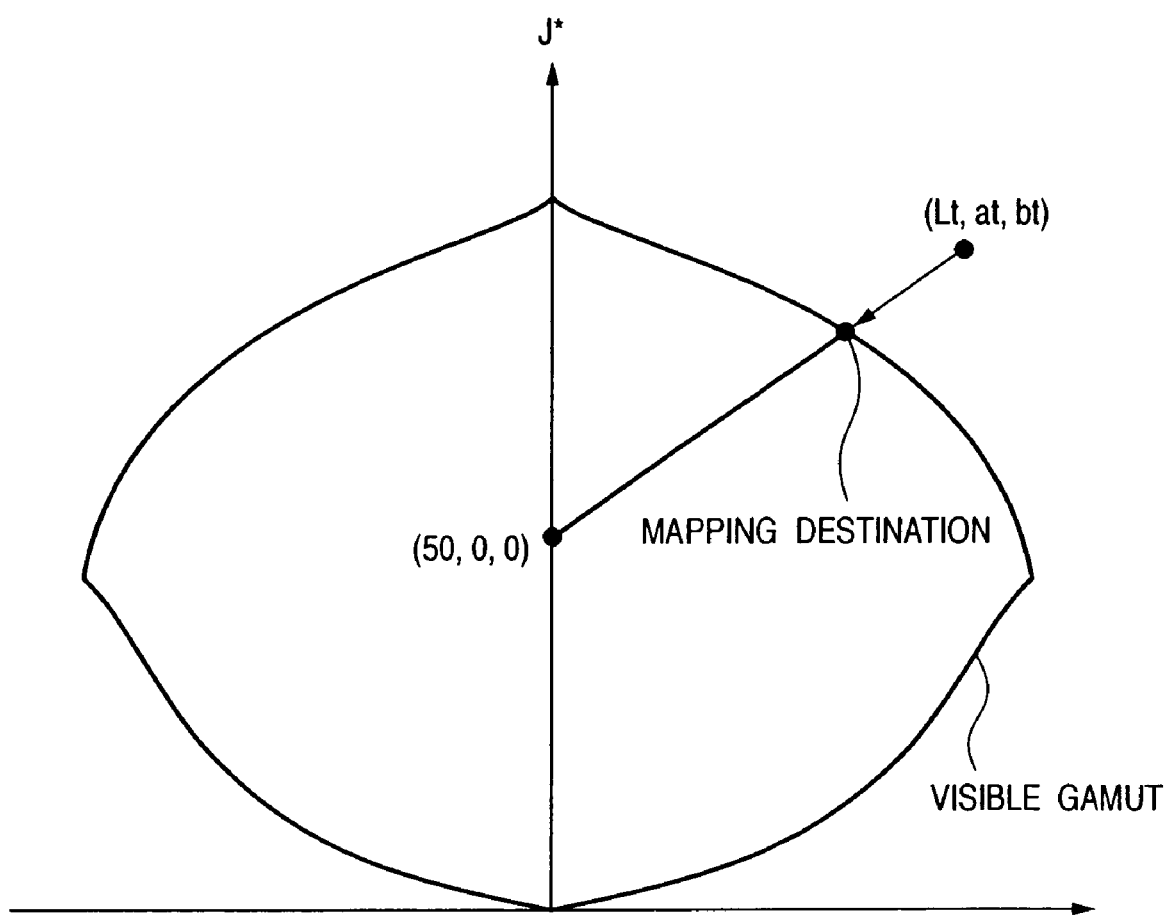
FIG. 12 shows a mapping example of grid point data outside of the visible region.

FIG. 12 shows a mapping example of grid point data outside of the visible region. For example, a line that connects grid point data (Lt, at, bt) and intermediate gray values (L*a*b*)=(50, 0, 0) on the CIELAB space is defined, and the grid point data (Lt, at, bt) is mapped on an intersection between that line and the visible gamut of the output device. That is, the coordinate values of that intersection are substituted in the mapped data (Lt, at, bt). Since the intersection can be easily calculated by solving an equation of a plane formed by three neighboring points which are located on the plane of the visible region, and an equation of the line, a description thereof will be omitted.

Figure 13:
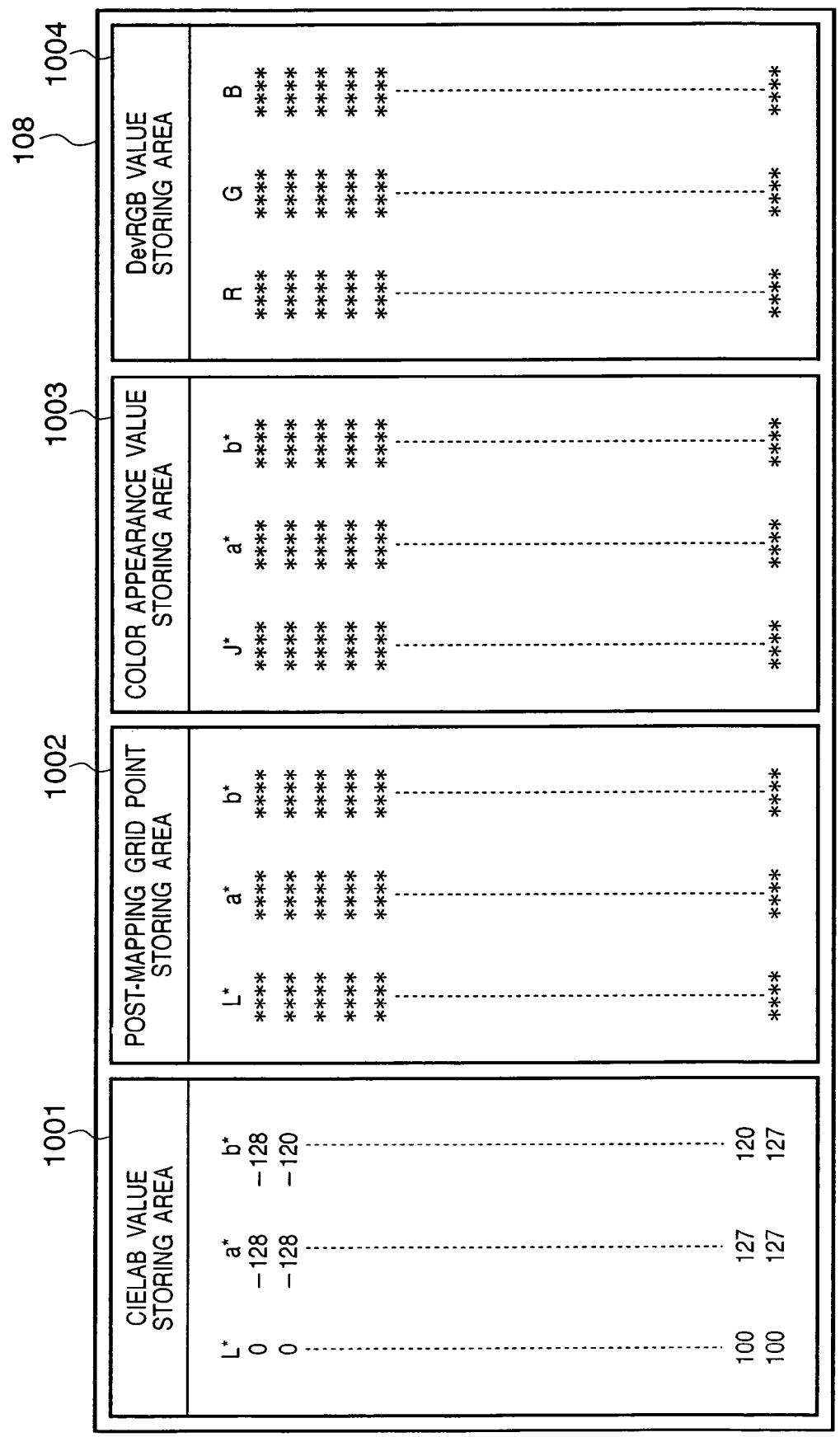
FIG. 13 shows the internal structure of the LUT memory.

FIG. 13 shows the internal structure (memory assignment) of the LUT memory 108. The LUT memory 108 has, in addition to a CIEL*a*b* value storing area 1001 that describes L*a*b* grid point data stored in advance, a post-mapping grid point storing area 1002 for storing those L*a*b* data (i.e., grid point data after mapping) obtained by moving L*a*b* grid point data into the visible region, a color appearance value storing area 1003 for storing color appearance values J*a*b* corresponding to mapping grid point data, and a DevRGB value storing area 1004 for storing the DevRGB values of the output device.

Next, it is checked if the process for all grid points is complete (S27). If the process for all grid points is complete, the process ends; otherwise, the flow returns to step S22 to repeat the aforementioned process until the process for all grid points is completed.

Note that the accurate visible gamut can be hold. For example, a plurality of color data, which are exist on a boundary of the visible region, are held as information of the visible region, and a polyhedron composed by a plurality of triangles is generated based on the held color data. Then determination to accurately determine whether input data is included in the visible region or not can be executed by determining whether the input data is included in the polyhedron or not.

[Color Appearance Converter]

Figure 14:
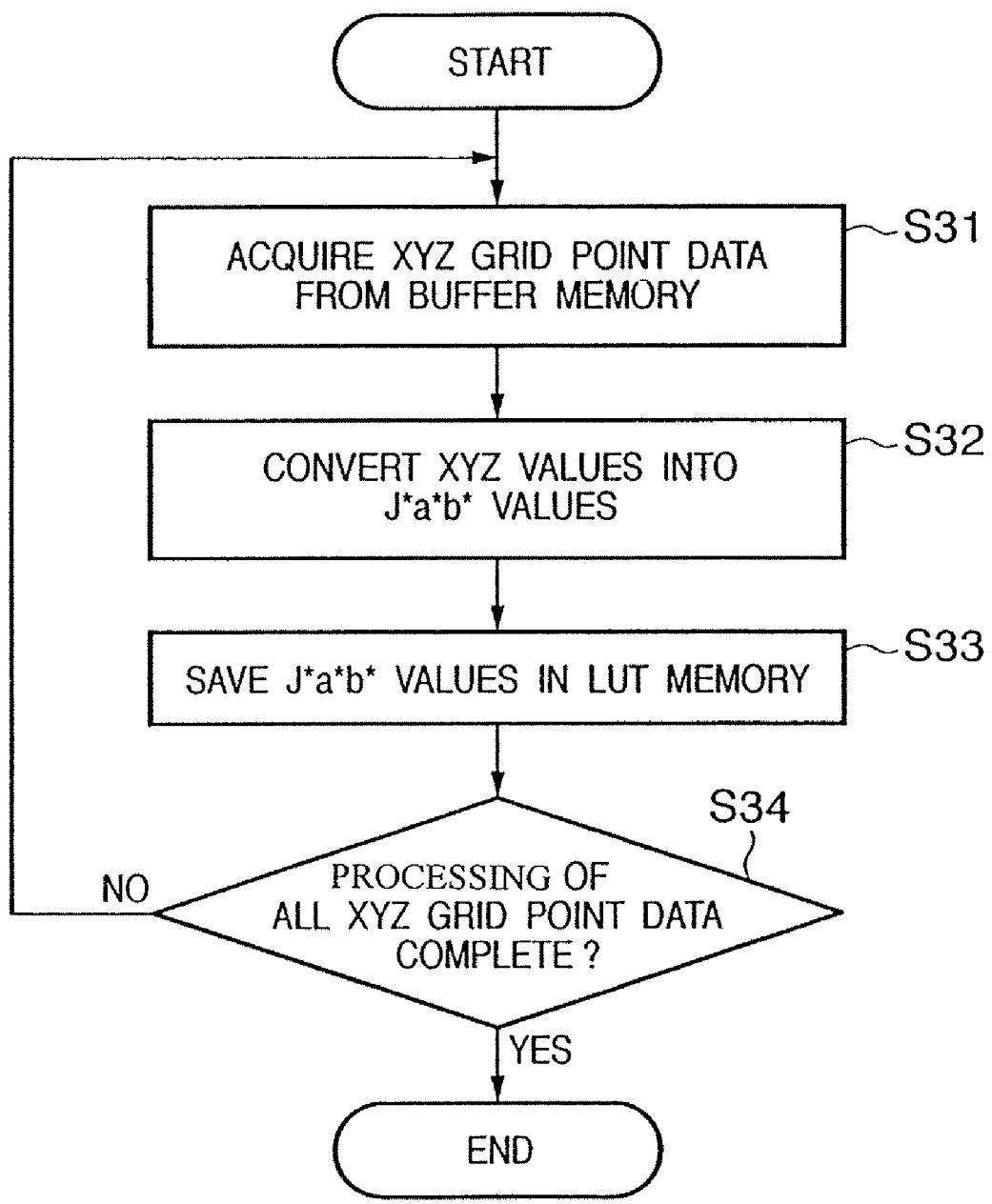
FIG. 14 is a flowchart for explaining the process of a color appearance converter.

FIG. 14 is a flowchart for explaining the process (S4) of the color appearance converter 103.

XYZ grid point data are acquired from the buffer memory 109 (S31). The acquired XYZ values are converted into J*a*b* values as color values of the color appearance space by the color appearance conversion in accordance with the viewing condition (i.e., the viewing condition of the profile) depend on the XYZ values (S32), and the J*a*b* values are saved in the color appearance value storing area 1003 of the LUT memory 108 (S33).

It is checked if the color appearance conversion of all XYZ grid point data saved in the buffer memory 109 is complete (S34). If all the data have been converted, the process ends; otherwise, the flow returns to step S31 to repeat the aforementioned process until the conversion of all XYZ grid point data is completed.

[Gamut Mapping Section]

Figure 15:
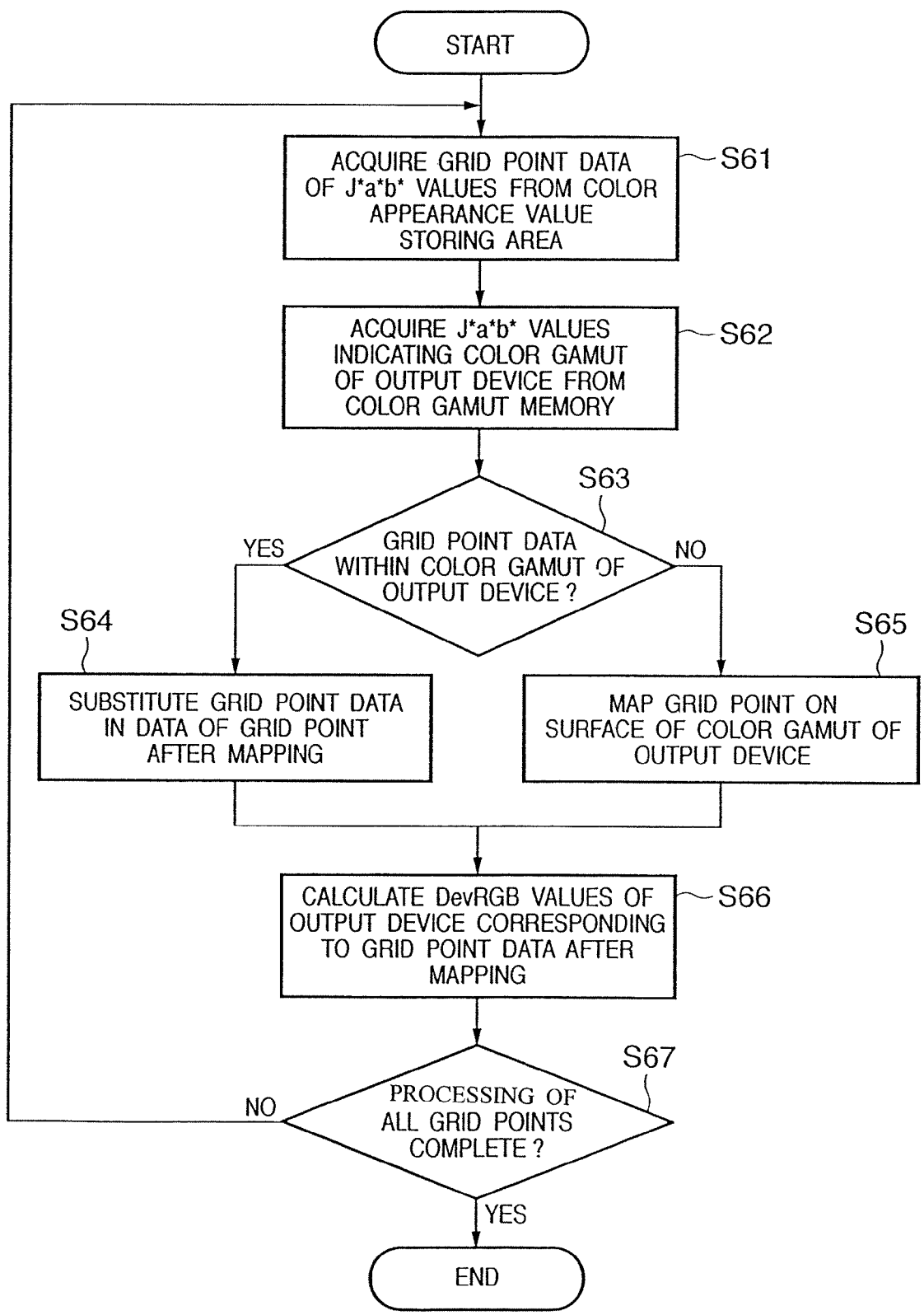
FIG. 15 is a flowchart for explaining the process of a gamut mapping section.

FIG. 15 is a flowchart for explaining the process (S6) of the gamut mapping section 106.

Grid point data (Jt, at, bt) of J*a*b* values is acquired from the color appearance value storing area 1003 of the LUT memory 108 (S61), and J*a*b* values indicating the color gamut of the output device (calculated in step S5) are acquired from the color gamut memory 107 (S62). It is then checked if the grid point data (Jt, at, bt) falls within the color gamut of the output device (S63). Since the color gamut inside/output determination method has already been described in the paragraphs of the operation of the grid point moving section 105, a description thereof will be omitted.

If it is determined that the grid point data falls within the color gamut, the grid point data (Jt, at, bt) is substituted in data (Jk, ak, bk) after mapping of that grid point (S64); if it is determined that the grid point data falls outside the color gamut, the grid point data (Jt, at, bt) is mapped on the surface of the color gamut of the output device (S65). Note that mapping can use the same method as that which has been described in the paragraphs of the operation of the grid point moving section 105.

DevRGB values of the output device corresponding to the mapped data (Jk, ak, bk) are calculated, and are saved in the DevRGB value storing area 1004 of the LUT memory 108 (S66). An example of the DevRGB calculation method will be described using FIG. 10. As described above, a point within a device gamut can be expressed by equation (4), and satisfies inequalities (5) and (6). Hence, a tetrahedron ABCD which satisfies this condition is retrieved to calculate s, t, and u in equation (4). Then, DevRGB values can be obtained using:

$$R=R_A+s(R_B-R_A)+t(R_C-R_A)+u(R_D-R_A)$$

$$G=G_A+s(G_B-G_A)+t(G_C-G_A)+u(G_D-G_A)$$

$$B=B_A+s(B_B-B_A)+t(B_C-B_A)+u(B_D-B_A) \quad (7)$$

where $R_A$, $G_A$, and $B_A$ are DevRGB values corresponding to point A, $R_B$, $G_B$, and $B_B$ are DevRGB values corresponding to point B, $R_C$, $G_C$, and $B_C$ are DevRGB values corresponding to point C, and $R_D$, $G_D$, and $B_D$ are DevRGB values corresponding to point D. The DevRGB values of respective vertices are stored in the color gamut memory 107.

It is checked if the process of all grid point data is complete (S67). If the process is complete, the process ends; otherwise, the flow returns to step S61 to repeat the aforementioned process until the process of all grid point data is completed.

In this way, upon generating an LUT in the ICC profile format that describes the mapping process using the color appearance space, a grid point outside of the visible region, which cannot be converted by the color appearance conversion formula, is mapped within the visible region in advance, and then undergoes color appearance conversion. Hence, the LUT without any information loss associated with grid points outside of the visible region can be generated. Hence, upon converting an image by the ICC profile using this LUT, when a color that barely falls within the visible region is input and is interpolated using grid points outside of the visible region, a satisfactory conversion result can be obtained.

[Modification of Embodiment]

In the description of the above embodiment, output device gamut data to be loaded by the input section 101 are CIEXYZ values. Alternatively, color appearance values J*a*b* that have undergone color appearance conversion in advance may be input.

In the above embodiment, the output device gamut to be input is expressed by CIEXYZ values obtained by 9-slicing RGB data. However, the present invention is not limited to 9 slices, and any other numbers of slices may be adopted as long as the color gamut of the output device can be specified. For example, the number of slices may be decreased to 5 or 7 so as to reduce the computation volume, or it may be increased to 12 or 17 so as to improve precision. Hence, the number of slices can be selectively used depending on the purpose intended.

The process of the gamut mapping section 106 in the above embodiment adopts the method of expressing a color within the output device gamut intact, and mapping a color outside the color gamut on the surface of the color gamut. However, the present invention is not limited to this. For example, a method of converting a color within the color gamut into a specific color, or a method of mapping a color outside the color gamut into the color gamut to maintain tone may be used.

The above embodiment has exemplified the color appearance space that models the human visual character with higher precision. As examples of the color appearance space, CIECAM97s, CIECAM02, and the like specified (recommended) by CIE are available.

In the description of the above embodiment, the ICC profile corresponding to CIEL*a*b* is used. However, the present invention can also be applied to ICC profiles corresponding to other color spaces such as CIEXYZ and the like. CIEXYZ can also express colors outside of the visible region, and causes the same problems as in CIEL*a*b* when the color appearance model is used.

In the above description, the embodiment in which the present invention is applied upon generating the ICC profile has been explained. However, the present invention can also be applied to other embodiments that perform a color process (e.g., color adjustment) on the color appearance space.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-106360, filed on Mar. 31, 2004, which is hereby incorporated by reference herein.

What is claimed is:

1. A method of generating a lookup table for color processing, the lookup table having plural output color data, the plural output color data corresponding to plural input color data to be input to the lookup table, and the plural input color data including both input color data inside a visible region of a human and input color data outside the visible region, the method comprising:

using a processor to perform the steps of:
storing first information which indicates the visible region in a Lab color space, wherein the first information is defined as a set of a plurality of sub-regions each corresponding to a polyhedron in the RGB color space, and vertices of each polyhedron correspond to grid points used to represent the visible region in the RGB color space;
storing second information which indicates a color gamut of an output device in an XYZ color space;
obtaining a set of grid points in the Lab color space stored in a memory in advance, wherein the set of grid points corresponds to input color data of the lookup table;
determining that a grid point is in the visible region if it is included in any one of the plurality of sub-regions;
mapping the grid points which are not included in any of the plurality of sub-regions into the visible region according to a mapping method to generate a set of mapped grid points;
performing a conversion process using a color appearance model to produce a set of color appearance data from the grid points included in the visible region, the set of mapped grid points and the XYZ data of the second information, wherein the conversion process utilizes an exponentiation calculation (a) whose base is positive for input color data inside the visible region, and (b) whose base may be negative for input color data outside the visible region;
mapping the set of color appearance data into the color gamut indicated by the second information according to the mapping method and converting the mapped set of color appearance data into a set of RGB data in the DevRGB color space;
generating the lookup table data in which the input comprises the set of grid points in the LAB space and the output comprises the set of RGB data in the DevRGB color space; and
wherein the mapping method maps color data outside a certain region to an intersection of a boundary of the certain region and a line connecting between a point corresponding to the color data and a specific point in a color space defining the certain region, and wherein in the mapping the grid points step the certain region is the visible region indicated by the first information, and in the mapping the set of color appearance data step the certain region is the region generated by color appearance model-converting the color gamut indicated by the second information.

2. The method according to claim 1, wherein the color appearance model is based on CIECAM02.

3. The method according to claim 1, wherein the color appearance is based on CIECAM97s.

4. The method according to claim 1, wherein the specific point is an intermediate gray point in the color space.

5. A color processing apparatus for generating a lookup table for color processing, the lookup table having plural output color data, the plural output color data corresponding to plural input color data to be input to the lookup table, and the plural input color data including both input color data inside a visible region of a human and input color data outside the visible region, comprising:
   a first memory, arranged to store first information which indicates the visible region in a Lab color space and second information which indicates a color gamut of an output device in an XYZ color space, wherein the first information is defined as a set of a plurality of sub-regions each corresponding to a polyhedron in the RGB color space, and vertices of each polyhedron correspond to grid points used to represent the visible region in the RGB color space;
   an obtaining section, arranged to obtain a set of grid points in the Lab color space stored in a memory in advance, wherein the set of grid points corresponds to input color data of the lookup table;
   a determiner, arranged to determine that a grid point is in the visible region if it is included in any one of the plurality of sub-regions;
   a first mapping section, arranged to map the grid points which are not included in any of the plurality of sub-regions into the visible region according to a mapping method to generate a set of mapped grid points;
   a converter, arranged to perform a conversion process using a color appearance model to produce a set of color appearance data from the grid points included in the visible region, the set of mapped grid points and the XYZ data of the second information, wherein the conversion process utilizes an exponentiation calculation (a) whose base is positive for input color data inside the visible region, and (b) whose base may be negative for input color data outside the visible region;
   a second mapping section, arranged to map the set of color appearance data into the color gamut indicated by the second information according to the mapping method and converting the mapped set of color appearance data into a set of RGB data in the DevRGB color space;
   a generator, arranged to generate the lookup table data in which the input comprises the set of grid points in the LAB space and the output comprises the set of RGB data in the DevRGB color space; and
   wherein the mapping method maps color data outside a certain region to an intersection of a boundary of the certain region and a line connecting between a point corresponding to the color data and a specific point in a color space defining the certain region, and
   wherein in the first mapping section the certain region is the visible region indicated by the first information, and in the second mapping section the certain region is the region generated by color appearance model-converting the color gamut indicated by the second information.

6. A non-transitory computer-readable medium storing, in executable form, a program for causing a computer to perform a method of generating a lookup table for color processing, the lookup table having plural output color data, the plural output color data corresponding to plural input color data to be input to the lookup table, and the plural input color data including both input color data inside a visible region of a human and input color data outside the visible region, the method comprising the steps of:
   storing first information which indicates the visible region in a Lab color space, wherein the first information is defined as a set of a plurality of sub-regions each corresponding to a polyhedron in the RGB color space, and vertices of each polyhedron correspond to grid points used to represent the visible region in the RGB color space;
   storing second information which indicates a color gamut of an output device in an XYZ color space;
   obtaining a set of grid points in the Lab color space stored in a memory in advance, wherein the set of grid points corresponds to input color data of the lookup table;
   determining that a grid point is in the visible region if it is included in any one of the plurality of sub-regions;
   mapping the grid points which are not included in any of the plurality of sub-regions into the visible region according to a mapping method to generate a set of mapped grid points;
   performing a conversion process using a color appearance model to produce a set of color appearance data from the grid points included in the visible region, the set of mapped grid points and the XYZ data of the second information, wherein the conversion process utilizes an exponentiation calculation (a) whose base is positive for input color data inside the visible region, and (b) whose base may be negative for input color data outside the visible region;
   mapping the set of color appearance data into the color gamut indicated by the second information according to the mapping method and converting the mapped set of color appearance data into a set of RGB data in the DevRGB color space;
   generating the lookup table data in which the input comprises the set of grid points in the LAB space and the output comprises the set of RGB data in the DevRGB color space; and
   wherein the mapping method maps color data outside a certain region to an intersection of a boundary of the certain region and a line connecting between a point corresponding to the color data and a specific point in a color space defining the certain region, and
   wherein in the mapping the grid points step the certain region is the visible region indicated by the first information, and in the mapping the set of color appearance data step the certain region is the region generated by color appearance model-converting the color gamut indicated by the second information.

* * * * *